United States Patent
Hanks et al.

(10) Patent No.: US 8,686,203 B2
(45) Date of Patent: Apr. 1, 2014

(54) PROCESS FOR PREPARING DIESEL FUELS USING VEGETABLE OILS OR FATTY ACID DERIVATIVES

(75) Inventors: Patrick L. Hanks, Annandale, NJ (US); Kathryn Y. Cole, Easton, PA (US); William E. Lewis, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 903 days.

(21) Appl. No.: 12/794,253

(22) Filed: Jun. 4, 2010

(65) Prior Publication Data

US 2010/0331586 A1 Dec. 30, 2010

Related U.S. Application Data

(60) Provisional application No. 61/268,460, filed on Jun. 12, 2009.

(51) Int. Cl.
*C07C 1/00* (2006.01)
*C10G 1/08* (2006.01)

(52) U.S. Cl.
USPC ........ 585/240; 585/242; 585/733; 585/739; 44/605

(58) Field of Classification Search
CPC ........ C10G 1/08; C10G 3/47; C10G 45/04; C10G 2300/1011; C10G 2300/1014; C10G 2300/1018; C10G 2300/40; Y02E 50/10; Y02E 50/13; Y02E 50/30
USPC ........ 585/240, 242, 733, 739; 44/354, 307, 44/308, 605
See application file for complete search history.

(56) References Cited

U.S. PATENT DOCUMENTS

| | | | |
|---|---|---|---|
| 6,156,695 A | 12/2000 | Soled et al. | |
| 6,162,350 A | 12/2000 | Soled et al. | |
| 6,299,760 B1 | 10/2001 | Soled et al. | |
| 6,582,590 B1 | 6/2003 | Riley et al. | |
| 6,712,955 B1 | 3/2004 | Hou et al. | |
| 6,783,663 B1 | 8/2004 | Riley et al. | |
| 6,863,803 B1 | 3/2005 | Riley et al. | |
| 6,929,738 B1 | 8/2005 | Riley et al. | |
| 7,229,548 B2 | 6/2007 | Riley et al. | |
| 7,288,182 B1 | 10/2007 | Soled et al. | |
| 7,410,924 B2 | 8/2008 | Corma Canos et al. | |
| 7,544,632 B2 | 6/2009 | Soled et al. | |
| 8,247,632 B2* | 8/2012 | Strege et al. | 585/733 |
| 8,278,492 B2* | 10/2012 | Myllyoja et al. | 585/240 |
| 2004/0230085 A1 | 11/2004 | Jakkula et al. | |
| 2004/0231237 A1* | 11/2004 | Boer et al. | 44/446 |
| 2005/0277545 A1 | 12/2005 | Shih et al. | |
| 2006/0060502 A1 | 3/2006 | Soled et al. | |
| 2007/0010682 A1* | 1/2007 | Myllyoja et al. | 554/174 |
| 2007/0084754 A1 | 4/2007 | Soled et al. | |
| 2008/0132407 A1 | 6/2008 | Bai et al. | |
| 2008/0163543 A1* | 7/2008 | Abhari et al. | 44/308 |

FOREIGN PATENT DOCUMENTS

| | | |
|---|---|---|
| EP | 1 911 735 A1 | 4/2008 |
| WO | 2004/007646 A1 | 1/2004 |
| WO | 2007/084437 A2 | 7/2007 |
| WO | 2007/084438 A2 | 7/2007 |
| WO | 2007/084439 A1 | 7/2007 |
| WO | 2007/084471 A1 | 7/2007 |
| WO | 2007/138254 A1 | 12/2007 |
| WO | 2008/012415 A2 | 1/2008 |
| WO | 2008/020048 A2 | 2/2008 |
| WO | 2008/040973 A8 | 4/2008 |
| WO | 2008/105518 A1 | 9/2008 |
| WO | 2009/011639 A2 | 1/2009 |

* cited by examiner

*Primary Examiner* — Nina Bhat
(74) *Attorney, Agent, or Firm* — David M. Weisberg; Chad A. Guice

(57) ABSTRACT

A process for preparing fuels, such as diesel fuels or jet fuels, by hydrotreating vegetable oils or fatty acid derivatives that may be applied to existing equipment for treating fossil fuels. The process comprises feeding hydrotreating a combined oxygenate feed stream, such as FAME, and a hydrocarbon feed stream until not more than 86 wt % of the esters in the oxygenate feed stream are converted to hydrocarbons, and optionally further hydrotreating the product stream within at least a second hydrotreatment reaction zone until at least 90 wt % of the esters in the oxygenate feed stream are converted to hydrocarbons, before removing and separating a hydrocarbon stream suitable for use as fuel.

34 Claims, No Drawings

PROCESS FOR PREPARING DIESEL FUELS USING VEGETABLE OILS OR FATTY ACID DERIVATIVES

This application claims the benefit of U.S. Provisional Application 61/268,460 filed Jun. 12, 2009.

FIELD OF THE INVENTION

This invention relates to a process for preparing fuels such as diesel fuels, heating oil, or jet fuels, using vegetable oils or fatty acid derivatives derived from them. In particular it relates to a process for hydrotreating vegetable oils or fatty acid derivatives that may be applied to existing equipment for treating fossil fuels.

BACKGROUND OF THE INVENTION

Environmental interests and an increasing worldwide demand for energy have encouraged energy producers to investigate renewable energy sources, including biofuels. Biofuel is obtained from biological material that is living or relatively recently lifeless, in contrast to fossil fuels (also referred to as mineral fuels) which are derived from ancient biological material. There is particularly interest in biofuels where, as in Europe, regulatory requirements have been or will be introduced that will require increased use of biofuels for motor vehicles, principally by blending with mineral fuels.

Biofuels are typically made from sugars, starches, vegetable oils, or animal fats using conventional technology from basic feedstocks, such as seeds, often referred to as bio-feeds. For example, wheat can provide starch for fermentation into bioethanol, while oil-containing seeds such as sunflower seeds provide vegetable oil that can be used in biodiesel.

Some diesel engines are compatible with pure biodiesel, without the need for modifications. But generally biodiesel is mixed with mineral diesel so that it may be used in a wider range of diesel engines. Currently vehicle manufacturers recommend use of fuel containing up to 15% biodiesel blended with mineral diesel.

The conventional approach for converting vegetable oils or other fatty acid derivatives into liquid fuels in the diesel boiling range is by a transesterification reaction with an alcohol, typically methanol, in the presence of catalysts, normally a base catalyst such as sodium hydroxide. The product obtained is typically a fatty acid alkyl ester, most commonly fatty acid methyl ester (known as FAME). While FAME has many desirable qualities, such as high cetane and its perceived environmental benefit, it has poor cold flow relative to mineral diesel because of its straight hydrocarbon chain. It also has lower stability because of the presence of ester moieties and unsaturated carbon-carbon bonds.

Hydrogenation methods are also known to convert vegetable oils or other fatty acid derivatives to hydrocarbon liquids in the diesel boiling range. These methods remove undesirable oxygen by hydrodeoxygenation to produce water, hydrodecarbonylation to produce CO, or hydrodecarboxylation to produce $CO_2$. In hydrodeoxygenation, unsaturated carbon-carbon bonds present in feed molecules are saturated (hydrogenated) before deoxygenation. Compared to transesterification, this type of hydrotreating has the practical advantage that it may be practiced in a refinery utilizing existing infrastructure. This reduces the need for investment and provides potential for operating on a scale that is more likely to be economical.

There are methods, developed by UOP (EcoFining) and Neste, which process triglycerides, such as found in vegetable oils, in a stand-alone manner. For instance, PCT Publication No. WO 2008/020048 describes a process for coprocessing triglycerides with heavy vacuum oil in single or multiple reactors, and partial hydrogenation of oxygenated hydrocarbon compounds such as glycerol is disclosed as being more desirable from the perspective of hydrogen consumption. PCT Publication No. WO 2008/012415 describes a process for the catalytic hydrotreatment of a feedstock derived from petroleum, of the gasoil type, in at least one fixed bed hydrotreatment reactor, wherein up to about 30% by weight of vegetable oils and/or animal fats are incorporated into the feedstock, and the reactor is operated in a single pass without recycle.

European Patent No. EP 1911735 describes co-hydrogenation of a carboxylic acid and/or derivative with a hydrocarbon stream from a refinery, as a retrofit. CoMo or NiMo catalysts are disclosed. It is stated that conditions are maintained in the reactor such that almost complete conversion of the carboxylic acid and/or ester is achieved, that is, greater than 90% conversion and preferably greater than 95% conversion. The product is described as suitable for use as or with a diesel fuel.

PCT Publication No. WO 2008/040973 describes a process, which is suitable as a retrofit, in which a mixed feed of carboxylic acid and/or derivatives including esters, and a refinery process stream, such as a diesel fuel, are hydrodeoxygenated or simultaneously hydrodesulfurized and hydrodeoxygenated. The catalyst may be Ni or Co in combination with Mo. The process produces a product which is described as suitable for use as diesel, gasoline or aviation fuel. It is stated that, under the described conditions, conversions of greater than 90% of the co-fed carboxylic acid and/or derivatives are typical and usually greater than 95% is achieved.

PCT Publication No. WO 2007/138254 describes a process in which in a first stage a hydrocarbon process stream, which may be a middle distillate, is hydrogenated and then fed with a carboxylic acid and/or ester to a second hydrogenation stage. The final product may be diesel fuel, and the benefits are said to be reduced exotherm, improved diesel yield, reduced fouling, reduced coking, and reduced residual olefins and/or heteroatoms. Mention is made of an alternative process in which an untreated hydrocarbon process stream is fed with the ester. Conditions in the second reactor are said to be the same as the first, and NiMo and CoMo are described as preferred catalysts for the first reactor. It is stated that conditions are maintained in the reactor such that almost complete conversion of the carboxylic acid and/or ester is achieved, that is greater than 90% conversion and preferably greater than 95% conversion.

Unlike conventional distillate hydrodesulfurization, direct hydrotreating of vegetable oils or animal fats requires a relatively high amount of hydrogen and is generally accompanied by a large amount of heat release, which requires extremely careful control. Otherwise undesirable side reactions, such as cracking, polymerization, and aromatization may result. Additionally, co-processing triglycerides and FAME over CoMo catalysts has shown a hydrodesulfurization debit. Therefore, there is a need for an improved hydrotreating process for vegetable oils and animal fats, and preferably that may be performed in existing equipment for treating mineral fuels.

SUMMARY OF THE INVENTION

According to this invention, there is provided a process for producing a hydrocarbon stream suitable for use as fuel from carboxylic esters, which process comprises the steps of:

a) feeding to a hydrotreatment reaction zone (i) an oxygenate feed stream comprising one or more methyl or ethyl esters of carboxylic acids, and (ii) a hydrocarbon feed stream;
b) contacting the feed streams within the hydrotreatment reaction zone with a gas comprising hydrogen under hydrotreatment conditions until not more than 86 wt % of the esters in the oxygenate feed stream are converted to hydrocarbons;
c) removing a hydrotreated product stream; and
d) separating from the hydrotreated product stream a hydrocarbon product stream suitable for use as fuel.

According to another aspect of the invention, the hydrotreated product stream obtained from the hydrotreatment reaction zone in step b) above can be further hydrotreated in at least a second hydrotreatment reaction zone by contacting with hydrogen under hydrotreatment conditions until at least 90 wt % (preferably at least 95 wt %, more preferably at least 99 wt %) of the esters in the oxygenate feed stream are converted to hydrocarbons; and in step c) the hydrotreated product stream can be removed from the second hydrotreatment reaction zone. This aspect of the invention may be applied to a broader range of carboxylic ester feedstocks.

Thus, in a second embodiment the invention comprises:
a) feeding to a first hydrotreatment reaction zone an oxygenate feed stream comprising one or more esters, particularly alkyl esters, of carboxylic acids, and a hydrocarbon feed stream;
b) (i) contacting the feed streams within the first hydrotreatment reaction zone with a gas comprising hydrogen under hydrotreatment conditions until not more than 86% of the esters in the oxygenate feed stream are converted by hydrodeoxygenation to hydrocarbons,
  (ii) removing from the first hydrotreatment reaction zone a first hydrotreated product stream,
  (iii) contacting the first hydrotreated product stream within at least a second hydrotreatment reaction zone with a gas comprising hydrogen under hydrotreatment conditions until at least 90 wt % (preferably at least 95 wt %, more preferably at least 99 wt %) of the esters in the oxygenate feed stream are converted to hydrocarbons;
c) removing from the second hydrotreatment reaction zone a second hydrotreated product stream; and
d) separating from the second hydrotreated product stream a hydrocarbon stream suitable for use as fuel.

As used herein, the phrase "alkyl ester", with reference to esters of carboxylic acids treated according to the second embodiment, should be understood to mean a straight or branched hydrocarbon having from 1 to 24 (preferably from 1 to 18, more preferably from 1 to 12, for example from 1 to 8) carbon atoms attached via an ester bond to a carboxylate moiety. For clarity, though a preferred alkyl ester of a carboxylic acid includes fatty acid esters such as FAME, there is no requirement that the alkyl esters of carboxylic acids be characterized as "fatty acid" esters in order to be useful in the second embodiment of the invention.

The oxygenate feed stream for the second embodiment may be derived from biomass by a transesterification reaction with an appropriate alcohol, that is a $C_1$ to $C_{24}$ alcohol, in the presence of catalysts, normally a base catalyst such as sodium hydroxide, to obtain a fatty acid alkyl ester (e.g., where the alkyl group is a methyl and/or ethyl group). The oxygenate feed stream may contain esters of carboxylic acids which are saturated or unsaturated, with unsaturated esters containing one or more, typically one, two or three, olefinic groups per molecule. Examples of unsaturated esters include esters of oleic, linoleic, palmitic, and stearic acid. A preferred oxygenate feed stream for the second embodiment comprises one or more methyl or ethyl esters of carboxylic acids.

Whether used in the first or second embodiment, an oxygenate feed stream comprising one or more methyl or ethyl esters of carboxylic acids may be derived from biomass by a transesterification reaction with the appropriate alcohol, that is methanol and/or ethanol. Preferably, the oxygenate feed stream comprises fatty acid methyl ester (FAME), although, where a lower net greenhouse gas emissions effect process is of increased importance, processing of fatty acid ethyl esters (FAEE) can be advantageous (due to the use of ethanol instead of methanol as a transesterification agent).

The processes of the invention provide for the manufacture of hydrocarbons for fuels that have relatively low (e.g., trace) amounts of sulfur and have converted oxygenates, and especially converted FAME, by coprocessing the oxygenates with a hydrocarbon feed stream.

The conversion of the esters in the oxygenate feed stream to hydrocarbons may be the result of hydrodeoxygenation to form water and a hydrocarbon, hydrodecarboxylation to produce CO and a hydrocarbon, and/or hydrodecarboxylation to produce $CO_2$ and a hydrocarbon. Variations in the conditions such as temperature and hydrogen partial pressure can often dictate which mechanism(s) occur.

The application of the invention to the conversion of esters such as FAME may provide particular advantages over coprocessing of biofuels containing predominantly non-transesterified vegetable oils with a hydrocarbon feed stream; a non-exclusive list of these advantages can include, but is not necessarily limited to:
  1. Esterified carboxylic (fatty) acids such as FAME are inherently more thermally stable than vegetable oils, which can result in:
    a) improved processability;
    b) less gas make from cracking; and/or
    c) being able to process at higher temperatures, such as those encountered in cat feed hydrotreaters and hydrocracker pretreaters, and under the more severe conditions near the end of a catalyst run, which allows longer run lengths.
  2. Mild hydrotreatment conditions, such as those found in some distillate hydrofiners, may not result in complete conversion of vegetable oil, and unconverted vegetable oil may cause fouling downstream as it tends to have a high molecular weight. If esterified carboxylic (fatty) acids such as FAME are not completely hydrodeoxygenated, because they are typically in the same molecular weight range as diesel, it should not adversely impact the diesel pool or give rise to significant fouling.
  3. More esterified carboxylic (fatty) acids such as FAME can be processed in a unit as compared to vegetable oil, or conversely a unit to process a certain volume of such esterified carboxylic (fatty) acids would be smaller than a unit to process the same amount of vegetable oil.
  4. Esterified carboxylic (fatty) acids such as FAME tend to be smaller molecules, and therefore less resistant to diffusion, than vegetable oils. In a diffusion limited environment such as that encountered in a hydrotreatment reactor, esterified carboxylic (fatty) acids such as FAME are preferred for one or more of the following reasons:
    a. fewer hot spots can tend to develop in the catalyst, permitting
    b. a higher temperature in the reactor;
    c. less coking can tend to occur; and
    d. better catalyst utilization.

In the embodiment of the invention using two hydrotreatment reaction zones, the zones may be present in separate reactors or as distinct zones within a single reactor; this embodiment may have a number of further advantages. For example, by operating in two separate stages of hydrotreatment, heat can be removed between reactors using heat exchangers or quench gas, which can facilitate better control of heat release from the process. Additionally or alternately, it may be possible to separate out at least a portion of light ends, such as CO, $CO_2$, or water, from the first hydrotreated product (preferably at least 10% by weight, more preferably at least 30% by weight, and most preferably at least 50% by weight, based on the weight of light ends in the first hydrotreated product) before entering the second reaction zone, which may improve catalyst activity and cycle length.

In certain cases, processing biofeeds can reduce the activity of hydrodesulfurization catalysts relative to processing conventional mineral streams from a refinery. The processes of the invention can advantageously make it easier to manage this loss of activity, as conditions in the second reaction zone can compensate for any additional sulfur passing through from the first reaction zone.

Additionally, as the olefin saturation and alkyl (methyl) removal are typically exothermic, one could use the heat of reaction from the first reaction zone to preheat the liquid to the necessary inlet temperature of the second reaction zone.

BRIEF DESCRIPTION OF THE DRAWING

The FIGURE is a schematic representation of apparatus for carrying out an embodiment of the process of the invention with two hydrotreatment reaction zones situated in two separate reactors. This is one of many possible configurations of apparatus for carrying out the process of the invention.

DETAILED DESCRIPTION OF THE PREFERRED EMBODIMENTS

One of the advantages of the processes of the invention is that the process may be carried out in conventional hydrotreatment facilities found in a refinery. Thus, the or each hydrotreatment reaction zone may be, for example, a diesel hydrotreater, cat feed hydrotreater (CFHT), or hydrocracker-hydrotreater. This may enable the process to be a retrofit into existing refinery facilities, which reduces investment costs in equipment. The embodiment of the invention that uses a two stage treatment is particularly beneficial for a retrofit, as it enables more constrained existing units to be employed.

The oxygenate feed stream may be derived from biomass, and is preferably derived from plant oils such as rapeseed oil, palm oil, peanut oil, canola oil, sunflower oil, tall oil, corn oil, soybean oil, olive oil, jatropha oil, jojoba oil, and the like, and combinations thereof. It may additionally or alternately be derived from animal oils and fats, such as fish oil, lard, tallow, chicken fat, milk products, and the like, and combinations thereof, and/or from algae. Waste oils such as used cooking oils can also be used.

A typical feed stream contains alkyl (preferably methyl and/or ethyl, for example methyl) esters of carboxylic acids such as methyl esters of saturated acids (typically having from 8 to 36 carbons attached to the carboxylate carbon, preferably from 10 to 26 carbons, for example from 14 to 22 carbons), which may contain one more unsaturated carbon-carbon bonds. Preferred FAME feedstreams can contain:

Methyl ester of $C_{18}$ saturated acid
Methyl ester of $C_{18}$ acid with 1 olefin bond
Methyl ester of $C_{18}$ acid with 2 olefin bonds
Methyl ester of $C_{18}$ acid with 3 olefin bonds
Methyl ester of $C_{20}$ saturated acid The hydrocarbon feed stream may be a refinery process stream or a synthetic stream such as may be derived from a Fischer-Tropsch synthesis. The hydrocarbon feed stream may be already suitable for use as a fuel, such as gasoline, diesel or aviation fuel. It may alternatively be a stream obtained from the refinery which requires further processing to be suitable for use as fuel. For example, it may be a stream such as a distillate, and in particular a straight run middle distillate, a light or heavy gas oil fraction or a catalytically cracked vacuum gas oil. Mixtures of refinery streams and/or synthetic streams may also be used. The hydrocarbon feed stream may contain heteroatom-containing compounds such as sulfur-containing compounds. The hydrotreatments of the process of the invention can, in preferred embodiments, simultaneously desulfurize the hydrocarbon feed when converting the oxygenate feed to hydrocarbons.

The relative proportions of the oxygenate feed and the hydrocarbon feed streams will generally be dictated by the amount of biofuel desired in the ultimate (e.g., diesel fuel) product. The oxygenate feed typically comprises from 0.5 to 50 wt % of the combined feed to the hydrotreatment reaction zone in step a), preferably from 1 to 15 wt % of the combined feed. The oxygenate feed preferably comprises FAME, for example at least 50 wt % FAME, and can consist essentially of FAME. In one process, the combined feed contains not more than 5 wt % FAME.

The hydrotreatment in step b) can advantageously be carried out under relatively mild conditions, so that no more than 86 wt % of the esters in the oxygenate feed stream are converted to hydrocarbons. In one preferred embodiment, no more than 70 wt % of the esters in the oxygenate feed stream are converted to hydrocarbons.

In the embodiment of the invention where there are two hydrotreatment reaction zones, the hydrotreatment in step b) is preferably carried out under conditions so that no more than 50 wt %, more preferably no more than 40 wt %, of the esters in the oxygenate feed stream are converted to hydrocarbons in the first hydrotreatment reaction zone. In that embodiment the hydrotreatment in the second reaction zone is preferably carried out under conditions so that the product stream taken from the second hydrotreatment reaction zone contains less than 10 wt % esters, typically less than 5 wt % esters, and more preferably less than 1 wt % esters.

The hydrotreatment is typically carried out at temperatures in the range of from about 150° C. to about 430° C. and pressures of from about 0.1 MPaa to about 25 MPaa.

Where the hydrotreatment is carried out in a single reaction zone, the temperature can preferably range from about 200° C. to about 400° C., more preferably from about 250° C. to about 380° C. However, in the embodiments of the invention where there are two stages of hydrotreatment, the temperature in each reaction zone may be lower, as a milder hydrotreatment is carried out; in such embodiments, the temperature can preferably range from about 150° C. to about 300° C., more preferably from about 200° C. to about 300° C. Additionally or alternately, in certain two stage hydrotreatment embodiments, the temperature in the first reaction zone can advantageously be lower than the temperature in the second reaction zone.

The hydrotreatment can advantageously be carried out at pressures of from about 1 MPaa to about 20 MPaa. The hydrogen partial pressure in the hydrotreatment reaction zone(s) is (are) preferably from about 1 MPaa to about 15 MPaa. The hydrogen used in any hydrotreatment process according to the invention may be a substantially pure, fresh feed, but it is also possible to use recycled hydrogen-containing feed from elsewhere in the process, or from the refinery, that may contain contamination from by-products, preferably such that the chemical nature and/or the concentration of the by-products in the hydrogen does not cause a significant reduction (e.g., not more than a 10% reduction, preferably not more than a 5% reduction) in the activity and/or lifetime of any catalyst to which the hydrogen is exposed. The hydrogen treat gas ratio can typically be in the range of about 50 $Nm^3/m^3$ (about 300 scf/bbl) to about 1000 $Nm^3/m^3$ (about 5900 scf/bbl). In certain embodiments, typically when relatively milder hydrotreatment conditions are desired, the hydrogen treat gas ratio can be from about 75 $Nm^3/m^3$ (about 450 scf/bbl) to about 300 $Nm^3/m^3$ (about 1800 scf/bbl) or from about 100 $Nm^3/m^3$ (about 600 scf/bbl) to about 250 $Nm^3/m^3$ (about 1500 scf/bbl). In other embodiments, typically when relatively harsher hydrotreatment conditions are desired, the hydrogen treat gas ratio can be from about 300 $Nm^3/m^3$ (about 1800 scf/bbl) to about 650 $Nm^3/m^3$ (about 3900 scf/bbl) or from about 350 $Nm^3/m^3$ (about 2100 scf/bbl) to about 550 $Nm^3/m^3$ (about 3300 scf/bbl).

The hydrotreatment step(s) may be catalyzed, and suitable catalysts include those comprising one or more Group VIII metals and one or more Group VIB metals, for example comprising Ni and/or Co and W and/or Mo, preferably comprising a combination of Ni and Mo, or Co and Mo, or a ternary combination such as Ni, Co, and Mo or such as Ni, Mo, and W. The or each hydrotreatment catalyst is typically supported on an oxide such as alumina, silica, zirconia, titania, or a combination thereof, or another known support material such as carbon. Such catalysts are well known for use in hydrotreatment and hydrocracking.

A NiMo catalyst is preferably used to initiate olefin saturation at a lower inlet temperature. Most units are constrained by a maximum operating temperature, and large amounts of heat are released from treatment of biofeeds. Initiating olefin saturation at lower temperature with NiMo allows for longer cycle lengths (as the maximum temperature will be reached later) and/or permits processing of more biofeeds.

A CoMo catalyst is preferably used for lower hydrogen partial pressure desulfurization and to slow down the kinetics of biofeed treatment. Spreading the exotherm out throughout the process by having such a lower activity catalyst will reduce the number of hotspots (which decrease in efficiency of the unit, and potentially give rise to structural issues if near reactor walls). At high hydrogen partial pressures, the use of CoMo may also reduce the amount of methanation (e.g., $CO+3H_2 \rightarrow CH_4+H_2O$ and/or $CO_2+4H_2 \rightarrow CH_4+2H_2O$) that occurs, which helps to reduce hydrogen consumption.

As used herein, the terms "CoMo" and "NiMo" refer to comprising oxides of molybdenum and either cobalt or nickel, respectively, as catalytic metals. Such catalysts may also optionally include supports and minor amounts of other materials such as promoters. By way of illustration, suitable hydrotreating catalysts are described, for example, in one or more of U.S. Pat. Nos. 6,156,695, 6,162,350, 6,299,760, 6,582,590, 6,712,955, 6,783,663, 6,863,803, 6,929,738, 7,229,548, 7,288,182, 7,410,924, and 7,544,632, U.S. Patent Application Publication Nos. 2005/0277545, 2006/0060502, 2007/0084754, and 2008/0132407, and International Publication Nos. WO 04/007646, WO 2007/084437, WO 2007/084438, WO 2007/084439, and WO 2007/084471, inter alia.

A combination of catalysts may be used in the first or in the second (or subsequent) hydrotreatment reaction zones. These catalysts may be arranged in the form of a stacked bed. Alternatively, one catalyst may be used in first hydrotreatment reaction zone and a second catalyst in the second (or subsequent) hydrotreatment reaction zones. In a preferred arrangement the first hydrotreatment reaction zone comprises a stacked bed of NiMo catalyst, followed by a CoMo catalyst. The second reaction zone preferably comprises a CoMo catalyst. Nevertheless, in alternate arrangements stacked bed arrangements, the NiMo catalyst in the first hydrotreatment zone may be substituted with a catalyst containing Ni and W metals or a catalyst containing Ni, W, and Mo metals.

The hydrotreatment may be conducted at liquid hourly space velocities (LHSV) of from about 0.1 $hr^{-1}$ to about 10 $hr^{-1}$, for example from about 0.3 $hr^{-1}$ to about 5 $hr^{-1}$, preferably from about 0.5 $hr^{-1}$ to about 5 $hr^{-1}$. In the embodiment of the invention where there are two stages of hydrotreatment, the conditions in either or each reaction zone (or each reactor, where the reaction zones are in separate reactors) may be milder, and as indicated above this may be achieved by using lower temperatures. Alternatively or in addition, the LHSV may be increased to reduce severity. In such an embodiment, the LHSV is preferably from about 1 $hr^{-1}$ to about 5 $hr^{-1}$.

It is believed to be within the competence of one skilled in the art to select an appropriate catalyst, and then determine the specific conditions within the above-mentioned ranges under which the hydrotreatment according to the invention may be carried out, so that hydrodesulfurization of the hydrocarbon feed and conversion of the oxygenate feed to hydrocarbons can be achieved, e.g., without significant loss of hydrocarbons boiling in the diesel range due to unwanted hydrocracking.

Following hydrotreatment, whether in a single hydrotreatment step or in a sequence of two or more hydrotreatment steps, a hydrotreated product stream is recovered from the hydrotreatment and a hydrocarbon product stream suitable for use as fuel can then be separated from it. The hydrotreated product stream may be subjected to conventional separation processes to achieve this; for example, flash separation to remove light ends and gases, and fractionation to isolate hydrocarbons boiling in the diesel fuel range.

In addition, the hydrotreated product stream may be subjected to optional hydroisomerization over an isomerization catalyst to improve the properties of the final product, such as the cold flow properties.

In the embodiments of the invention where the hydrotreatment of an oxygenate feed stream comprising olefinic unsaturations and the hydrocarbon feed stream are carried out in two or more hydrotreatment reaction zones, the hydrotreatment is preferably conducted to split heat release between the two reaction zones. For example, in the first hydrotreatment reaction zone the olefins may be saturated, and the methyl or ethyl ester groups removed along with some oxygen removal, and then in the second hydrotreatment reactor the conversion to hydrocarbons suitable for use as fuel is completed. This enables each stage to be carried out under relatively milder conditions and with better control of heat release than would a single stage hydrotreatment to achieve similar hydrocarbon conversion.

The first hydrotreated product stream removed from the first hydrotreatment reaction zone may optionally be cooled before it is hydrotreated within the second hydrotreatment reaction zone using conventional means, such as heat exchangers or quench gas treatment. Heat recovered in this way may be used to preheat feed at other points in the process, such as the oxygenate feed or the hydrocarbon feed to the first reaction zone.

A further option is to pass the first hydrotreated product stream through a separator to separate out any light ends, CO, $CO_2$, or water before it is passed into the second reaction zone. Such removal of the CO and water may improve catalyst activity and cycle length.

The hydrocarbon product stream recovered from step d) may be used as fuel, such as diesel fuel, heating oil, or jet fuel, either alone or combined with other suitable streams. A preferred use of the hydrocarbon product stream is as diesel fuel and it may be sent to the diesel fuel pool. It may also be subjected to further convention treatments, including the addition of additives to enhance the performance, e.g., as a diesel fuel.

This invention extends to a fuel, such as diesel fuel, heating oil, or jet fuel, when prepared by the process as described herein.

In one embodiment, the product hydrocarbon stream recovered from step d) can comprise at least 90 wt % saturated hydrocarbons (preferably at least 93 wt % or at least 95 wt %; typically up to about 99.9 wt %, up to about 99.5 wt %, up to about 99 wt %, or up to about 98 wt %), less than 1 wt % ester-containing compounds (for example less than 0.5 wt %, less than 0.2 wt %, less than 0.1 wt %, less than 500 wppm, less than 200 wppm, or less than 100 wppm; if any ester-containing compounds are detectable, they can be present in amounts as low as 100 wppb, 200 wppb, 500 wppb, 1 wppm, 2 wppm, 5 wppm, or 10 wppm), less than 1 wt % acid-containing compounds (for example less than 0.5 wt %, less than 0.2 wt %, less than 0.1 wt %, less than 500 wppm, less than 200 wppm, less than 100 wppm, less than 75 wppm, less than 50 wppm, or less than 25 wppm; if any acid-containing compounds are detectable, they can be present in amounts as low as 100 wppb, 200 wppb, 500 wppb, 1 wppm, 2 wppm, or 5 wppm), and not more than 10 wppm sulfur-containing compounds, based on the total weight of the product hydrocarbon stream. In this embodiment, the product hydrocarbon stream can be used as, and/or can be used as a blend component in combination with one or more other hydrocarbon streams, to form a diesel fuel, a jet fuel, a heating oil, or a portion of a distillate pool.

In another embodiment, where there are at least first and second hydrotreatment reaction zones, the partially converted first hydrotreated product stream from step (b)(ii) can comprise from about 30 wt % to about 60 wt % of compounds containing only hydrogen and carbon atoms, at least about 4 wt % trans-esterified (i.e., containing the alkyl group from the alcohol, preferably methyl) ester-containing compounds, at least about 2 wt % acid-containing compounds that are fully saturated, and at least about 0.3 wt % alkyl alcohols, based on the total weight of the partially converted first hydrotreated product stream.

By way of illustration only, the invention is now described in more detail by reference to the accompanying drawings which show certain preferred or alternative aspects of the invention.

In the apparatus depicted in the FIGURE, the combined oxygenate feed stream and hydrocarbon feed stream are fed by line 1 into a reactor 3 which forms a first hydrotreatment reaction zone. Hydrogen is separately fed via line 2 into reactor 3.

After hydrotreatment in reactor 3, a first hydrotreated product stream 4 is fed to a high pressure separator 5, from the head of which a light stream is fed via line 7 to a low pressure separator 8. Light ends, and gases including $H_2S$, $NH_3$, CO and $CO_2$ are taken from the low pressure separator 8 via line 11 to a scrubber (not shown).

From the base of the high pressure separator 5 and from the low pressure separator 8, streams are fed by lines 6 and 9 respectively, to an optional intermediate feed surge tank 10 and then by line 12 into a second reactor 13 which forms a second hydrotreatment reaction zone. Fresh (or recycled) hydrogen is introduced into reactor 13 through line 14.

As an alternative to the arrangement shown in the FIGURE, a single stage of separation could replace separators 5 and 8.

After further hydrotreatment in reactor 13, a second hydrotreated product stream 15 is fed to another high pressure separator 16, from the head of which a light stream is fed via line 17 to another low pressure separator 18. Offgas is taken from the low pressure separator 18 via line 19 to a scrubber (not shown).

From the base of the high pressure separator 16 and from the low pressure separator 18, hydrocarbon streams suitable for use as diesel fuel are fed by lines 20 and 21 respectively, to the diesel pool 22.

Again, as an alternative to the arrangement shown in the FIGURE, a single stage of separation could replace separators 16 and 18.

Additionally or alternately, the present invention includes the following embodiments.

Embodiment 1. A process for producing a hydrocarbon stream suitable for use as fuel from carboxylic esters, which process comprises the steps of: a) feeding to a hydrotreatment reaction zone (i) an oxygenate feed stream comprising one or more methyl or ethyl esters of carboxylic acids, and (ii) a hydrocarbon feed stream; b) contacting the feed streams within the hydrotreatment reaction zone with a gas comprising hydrogen under hydrotreatment conditions until not more than 86 wt % of the esters in the oxygenate feed stream are converted to hydrocarbons; c) removing a hydrotreated product stream; and d) separating from the hydrotreated product stream a hydrocarbon stream suitable for use as fuel.

Embodiment 2. A process for producing a hydrocarbon stream suitable for use as fuel from carboxylic esters, which process comprises the steps of: a) feeding to a first hydrotreatment reactor an oxygenate feed stream comprising one or more esters of carboxylic acids, and a hydrocarbon feed stream; b) (i) contacting the feed streams within the first hydrotreatment reaction zone with a gas comprising hydrogen under hydrotreatment conditions until not more than 86 wt % of the esters in the oxygenate feed stream are converted to hydrocarbons, (ii) removing from the first hydrotreatment reaction zone a first hydrotreated product stream, and (iii) contacting the first hydrotreated product stream within at least a second hydrotreatment reaction zone with a gas comprising hydrogen under hydrotreatment conditions until at least 90 wt % of the esters in the oxygenate feed stream are converted to hydrocarbons; c) removing from the second hydrotreatment reaction zone a second hydrotreated product stream; and d) separating from the second hydrotreated product stream a hydrocarbon stream suitable for use as fuel.

Embodiment 3. A process according to embodiment 2, wherein the oxygenate feed stream comprises one or more methyl and/or ethyl esters of carboxylic acids, preferably methyl esters, and/or is derived from a plant oil, an animal oil or fat, algae, waste oil, or a combination thereof.

Embodiment 4. A process according to any of the preceding embodiments, wherein the oxygenate feed stream is obtained by transesterification of $C_8$ to $C_{36}$ carboxylic esters with an alcohol, preferably methanol, in the presence of a base catalyst.

Embodiment 5. A process according to any of the preceding embodiments, wherein the hydrocarbon feed is a middle distillate, a gas oil fraction, a vacuum gas oil, or a combination thereof.

Embodiment 6. A process according to any of the preceding embodiments, wherein the oxygenate feed comprises from about 1 wt % to about 15 wt % of the combined feed to the hydrotreatment reaction zone in step a).

Embodiment 7. A process according to embodiment 6, wherein the combined feed streams to the hydrotreatment reaction zone in step a) comprise not more than 5 wt % FAME.

Embodiment 8. A process according to any of the preceding embodiments, wherein the hydrotreatment in step b) is carried out under relatively mild conditions so that no more than 70 wt % of the esters in the oxygenate feed stream are converted to hydrocarbons.

Embodiment 9. A process according to any of the preceding embodiments, wherein the hydrotreatment in step b) is carried out at a temperature from about 150° C. to about 430° C. and a pressure from about 0.1 MPaa to about 25 MPaa, preferably at a temperature from about 250° C. to about 380° C. and a pressure from about 1 MPaa to about 15 MPaa.

Embodiment 10. A process according to embodiment 2 or embodiment 3, wherein the hydrotreatment in step b) is carried out under conditions so that no more than 50 wt %, more preferably no more than 40 wt %, of the esters in the oxygenate feed stream are converted to hydrocarbons in the first hydrotreatment reaction zone.

Embodiment 11. A process according to any of embodiments 2, 3, or 10, wherein the temperature in each reaction zone is from about 150° C. to about 300° C., preferably from about 200° C. to about 300° C., the pressure in each reaction zone is from about 1 MPaa to about 15 MPaa, and/or the LHSV in each reaction zone is from 0.3 hr$^{-1}$ to 5 hr$^{-1}$.

Embodiment 12. A process according to any of the preceding embodiments, wherein the or each hydrotreatment is catalyzed using a catalyst comprises two or more of Ni, Co, W, and Mo, optionally supported on alumina, silica, zirconia, titania or carbon, preferably wherein the or each catalyst comprises a combination of Ni and Mo, or Co and Mo, and optionally wherein the or each reaction zone comprises a stacked bed of NiMo catalyst, followed by a CoMo catalyst.

Embodiment 13. A process according to any of the preceding embodiments, wherein the hydrotreated product stream is subjected to hydroisomerization over an isomerization catalyst to improve cold flow properties of the hydrocarbon stream suitable for use as fuel.

Embodiment 14. A process according to any of embodiments 2, 3, 10, 11, or 12, wherein the first hydrotreated product stream removed from the first hydrotreatment reaction zone is cooled and/or passed through a separator to remove light ends, CO, $CO_2$, and water before being hydrotreated within the second hydrotreatment reaction zone.

Embodiment 15. A process according to any of the preceding embodiments wherein the hydrocarbon stream recovered after step d) is a diesel fuel.

The following Examples provide further illustration of aspects of the invention without limiting the scope of the invention.

EXAMPLES 1-7

An oxygenate feed comprising FAME was prepared by transesterification of rapeseed oil. The oxygenate feed had the following composition, set out in Table 1 below.

TABLE 1

| Wt % | Feed Component |
|---|---|
| 4.5% | Methyl ester of $C_{16}$ saturated acid |
| 1.6% | Methyl ester of $C_{18}$ saturated acid |
| 62.1% | Methyl ester of $C_{18}$ acid with 1 olefin bond |
| 19.3% | Methyl ester of $C_{18}$ acid with 2 olefin bonds |
| 10.0% | Methyl ester of $C_{18}$ acid with 3 olefin bonds |
| 0.5% | Methyl ester of $C_{20}$ saturated acid |

This oxygenate feed was combined with a hydrocarbon feed comprising a light gas oil (LGO) in various proportions. The proportions were chosen to demonstrate the effect of hydrotreatment, and do not necessarily reflect typical proportions likely to be chosen for diesel fuels, e.g., for sale in the short term in Europe. The combined feeds are shown in Table 2 below.

TABLE 2

| 40% bio wt % | 45% bio wt % | 50% bio wt % | Component |
|---|---|---|---|
| 1.81 | 2.03 | 2.26 | Methyl ester of $C_{16}$ saturated acid |
| 0.64 | 0.72 | 0.80 | Methyl ester of $C_{18}$ saturated acid |
| 24.85 | 27.95 | 31.06 | Methyl ester of $C_{18}$ acid with 1 olefin bond |
| 7.73 | 8.70 | 9.67 | Methyl ester of $C_{18}$ acid with 2 olefin bonds |
| 4.01 | 4.51 | 5.01 | Methyl ester of $C_{18}$ acid with 3 olefin bonds |
| 0.20 | 0.23 | 0.25 | Methyl ester of $C_{20}$ saturated acid |
| 60.00 | 55.00 | 50.00 | Hydrocarbons from LGO |

These combined feeds were then hydrotreated in single and double reactor arrangements. In Examples 1-5 the combined feeds were subjected to hydrotreatment, carried out in a single reactor containing two catalysts as a stacked bed. The first catalyst was a NiMo catalyst. The second catalyst was a CoMo catalyst. Examples 6 and 7 were hydrotreated in two successive reactors. The first reactor was the same as used in Examples 1-5, and the subsequent reactor contained only the CoMo catalyst. The tables below show the conditions in each stage, as well as the analysis of the hydrotreated product form each stage.

The conditions used in the Examples are set out in Table 3 below, the composition of the hydrotreated products obtained are set out in Table 4 below, and the conversion figures are set out in Table 5 below.

TABLE 3

| Example | 1 | 2 | 3 | 4 | 5 | 6 | | 7 | |
|---|---|---|---|---|---|---|---|---|---|
| No. of Reactors | 1 | 1 | 1 | 1 | 1 | 1 | 2 | 1 | 2 |
| Combined Feed | 40% bio | 40% bio | 40% bio | 45% bio | 50% bio | 50% bio | 50% bio | 50% bio | 50% bio |
| Inlet $H_2$ Partial Pressure, MPaa | 2.76 | 4.83 | 6.9 | 10.35 | 13.8 | 13.8 | 13.8 | 13.8 | 13.8 |
| First Reactor ° C. | 271.9 | 272.6 | 273.4 | 274.7 | 275.7 | 223.8 | — | 223.9 | — |
| Second Reactor ° C. | — | — | — | — | — | — | 251.1 | — | 251.1 |
| Treat Gas Ratio $H_2$ scf/bbl | 1370 | 1370 | 1370 | 1250 | 1250 | 1260 | 1260 | 1260 | 1260 |

TABLE 3-continued

| Example | 1 | 2 | 3 | 4 | 5 | 6 | | 7 | |
|---|---|---|---|---|---|---|---|---|---|
| LHSV, hr$^{-1}$ | 1.5 | 1.5 | 1.5 | 1.5 | 1.5 | 3 | 3 | 3 | 3 |
| Outlet H$_2$ Partial Pressure, MPaa | 2.08 | 3.65 | 5.26 | 6.69 | 7.44 | 12.78 | 12.78 | 12.78 | 12.78 |

TABLE 4

| wt % in product/Ex. # | 1 | 2 | 3 | 4 | 5 | 6 | | 7 | |
|---|---|---|---|---|---|---|---|---|---|
| Methyl ester of C$_{16}$ saturated acid | 0.4 | 0.3 | 0.2 | 0.2 | 0.2 | 1.9 | 1.4 | 1.8 | 1.4 |
| Methyl ester of C$_{18}$ saturated acid | 4.2 | 4.1 | 3.6 | 3.5 | 3.2 | 20.6 | 20.0 | 20.5 | 20.5 |
| Methyl ester of C$_{18}$ acid with 1 olefin bond | 4.0 | 2.9 | 1.5 | 1.1 | 0.6 | 14.2 | 7.0 | 14.8 | 7.0 |
| 1-octadecanol | 0.1 | 0.2 | 0.4 | 0.7 | 1.3 | 0.7 | 0.9 | 0.7 | 0.9 |
| Methyl ester of C$_{20}$ saturated acid | 0.1 | 0.1 | 0.1 | 0.1 | 0.1 | 0.5 | 0.5 | 0.5 | 0.5 |
| C$_{16}$ saturated acid | 0.4 | 0.2 | 0.2 | 0.1 | 0.1 | 0.1 | 0.2 | 0.1 | 0.2 |
| C$_{18}$ saturated acid | 4.9 | 4.8 | 4.3 | 4.3 | 3.9 | 2.7 | 5.8 | 2.3 | 6.0 |
| C$_{18}$ acid with 1 olefin bond | 1.1 | 0.7 | 0.4 | 0.2 | 0.0 | 0.2 | 0.1 | 0.2 | 0.2 |
| Hydrocarbons | 84.7 | 86.5 | 89.2 | 89.6 | 90.7 | 58.1 | 63.8 | 58.1 | 62.4 |

TABLE 5

| Example | 1 | 2 | 3 | 4 | 5 | 6 | | 7 | |
|---|---|---|---|---|---|---|---|---|---|
| Overall conversion of FAME, wt % | | | | | | | | | |
| C$_{16}$ | 80 | 81 | 87 | 89 | 92 | 17 | 39 | 20 | 37 |
| C$_{18}$ | 78 | 81 | 86 | 89 | 92 | 25 | 42 | 24 | 41 |
| Conversion of FAME to carboxylic acid, wt % | | | | | | | | | |
| C$_{16}$ | 22 | 12 | 9 | 7 | 6 | 4 | 9 | 3 | 9 |
| C$_{18}$ | 16 | 15 | 13 | 12 | 10 | 8 | 16 | 7 | 17 |
| Conversion of FAME to hydrocarbons, wt % | | | | | | | | | |
| C$_{16}$ | 58 | 69 | 78 | 82 | 86 | 13 | 30 | 17 | 28 |
| C$_{18}$ | 62 | 66 | 74 | 77 | 82 | 18 | 26 | 18 | 24 |

From these results it can be seen that the use of two reactors helps to spread heat release out between the reactors, potentially with heat exchangers to utilize heat integration techniques. This may allow for a larger amount of biofeeds to be treated. It also enables CO$_x$ to be removed before the second reactor, so reducing the hydrodesulfurization inhibition of the CoMo catalyst in the later stages. The arrangement may also allow the process to run at lower temperatures to meet a given sulfur targets, such as 10 ppm sulfur required for ultra low sulfur diesel (ULSD), by adjusting the temperatures and sulfur slip from the two reactors.

What is claimed is:

1. A process for producing a hydrocarbon stream suitable for use as fuel from carboxylic esters, which process comprises the steps of:
   a) feeding to a hydrotreatment reaction zone
      (i) an oxygenate feed stream comprising one or more methyl or ethyl esters of carboxylic acids, and
      (ii) a hydrocarbon feed stream;
   b) contacting the feed streams within the hydrotreatment reaction zone with a gas comprising hydrogen under hydrotreatment conditions so that no more than 70 wt % of the esters in the oxygenate feed stream are converted to hydrocarbons;
   c) removing a hydrotreated product stream; and
   d) separating from the hydrotreated product stream a hydrocarbon stream suitable for use as fuel.

2. A process according to claim 1, wherein the oxygenate feed stream is derived from a plant oil, an animal oil or fat, algae, waste oil, or a combination thereof.

3. A process according to claim 1, wherein the oxygenate feed stream is obtained by transesterification of C$_8$ to C$_{36}$ carboxylic esters with an alcohol in the presence of a base catalyst.

4. A process according to claim 3, wherein the oxygenate feed stream comprises fatty acid methyl esters.

5. A process according to claim 1, wherein the hydrocarbon feed is a middle distillate, a gas oil fraction, a vacuum gas oil, or a combination thereof.

6. A process according to claim 4, wherein the oxygenate feed comprises from about 1 wt % to about 15 wt % of the combined feed to the hydrotreatment reaction zone in step a).

7. A process according to claim 6, wherein the combined feed streams to the hydrotreatment reaction zone in step a) comprise not more than 5 wt % FAME.

8. A process according to claim 1, wherein the hydrotreatment in step b) is carried out at a temperature from about 150° C. to about 430° C. and a pressure from about 0.1 MPaa to about 25 MPaa.

9. A process according to claim 8, wherein the hydrotreatment in step b) is carried out at a temperature from about 250° C. to about 380° C. and a pressure from about 1 MPaa to about 15 MPaa.

10. A process according to claim 1, wherein the reaction zone has an LHSV from 0.3 hr$^{-1}$ to 5 hr$^{-1}$.

11. A process according to claim 1, wherein the hydrotreatment is catalyzed using a catalyst comprising two or more of Ni, Co, W, and Mo, optionally supported on alumina, silica, zirconia, titania, or carbon.

12. A process according to claim 1, wherein the hydrotreated product stream is subjected to hydroisomerization over an isomerization catalyst to improve cold flow properties of the hydrocarbon stream suitable for use as fuel.

13. A process according to claim 1, wherein the hydrocarbon stream recovered after step d) is a diesel fuel.

14. A process for producing a hydrocarbon stream suitable for use as fuel from carboxylic esters, which process comprises the steps of:
  a) feeding to a first hydrotreatment reactor an oxygenate feed stream comprising one or more esters of carboxylic acids, and a hydrocarbon feed stream;
  b) (i) contacting the feed streams within the first hydrotreatment reaction zone with a gas comprising hydrogen under hydrotreatment conditions so that no more than 50 wt % of the esters in the oxygenate feed stream are converted to hydrocarbons,
    (ii) removing from the first hydrotreatment reaction zone a first hydrotreated product stream, and
    (iii) contacting the first hydrotreated product stream within at least a second hydrotreatment reaction zone with a gas comprising hydrogen under hydrotreatment conditions until at least 90 wt % of the esters in the oxygenate feed stream are converted to hydrocarbons;
  c) removing from the second hydrotreatment reaction zone a second hydrotreated product stream; and
  d) separating from the second hydrotreated product stream a hydrocarbon stream suitable for use as fuel.

15. A process according to claim 14, wherein the oxygenate feed stream comprises one or more methyl and/or ethyl esters of carboxylic acids.

16. A process according to claim 14, wherein the oxygenate feed stream is derived from a plant oil, an animal oil or fat, algae, waste oil, or a combination thereof.

17. A process according to claim 14, wherein the oxygenate feed stream is obtained by transesterification of $C_8$ to $C_{36}$ carboxylic esters with an alcohol in the presence of a base catalyst.

18. A process according to 16, wherein the oxygenate feed stream comprises fatty acid methyl esters.

19. A process according to claim 14, wherein the hydrocarbon feed is a middle distillate, a gas oil fraction, a vacuum gas oil, or a combination thereof 20. A process according to claim 18, wherein the oxygenate feed comprises from about 1 wt % to about 15 wt % of the combined feed to the hydrotreatment reaction zone in step a).

21. A process according to claim 20, wherein the combined feed streams to the hydrotreatment reaction zone in step a) comprise not more than 5 wt % FAME.

22. A process according to claim 14, wherein the hydrotreatment in step b) is carried out under relatively mild conditions so that no more than 70 wt % of the esters in the oxygenate feed stream are converted to hydrocarbons.

23. A process according to claim 14, wherein the hydrotreatment in step b) is carried out at a temperature from about 150° C. to about 430° C. and a pressure from about 0.1 MPaa to about 25 MPaa.

24. A process according to claim 23, wherein the hydrotreatment in step b) is carried out at a temperature from about 250° C. to about 380° C. and a pressure from about 1 MPaa to about 15 MPaa.

25. A process according to claim 16, wherein the hydrotreatment in step b) is carried out under conditions so that no more than 40 wt %, of the esters in the oxygenate feed stream are converted to hydrocarbons in the first hydrotreatment reaction zone.

26. A process according to claim 25, wherein the temperature in each reaction zone is from about 150° C. to about 300° C., and the pressure in each reaction zone is from about 1 MPaa to about 15 MPaa 27. A process according to claim 14, wherein the or each reaction zone has an LHSV from 0.3 $hr^{-1}$ to 5 $hr^{-1}$.

28. A process according to claim 14, wherein each hydrotreatment is catalyzed using a catalyst comprising two or more of Ni, Co, W, and Mo, optionally supported on alumina, silica, zirconia, titania, or carbon.

29. A process according to claim 28, wherein each catalyst comprises a combination of Ni and Mo, or Co and Mo.

30. A process according to claim 28, wherein each reaction zone comprises a stacked bed of NiMo catalyst, followed by a CoMo catalyst.

31. A process according to claim 14, wherein the hydrotreated product stream is subjected to hydroisomerization over an isomerization catalyst to improve cold flow properties of the hydrocarbon stream suitable for use as fuel.

32. A process according to claim 14, wherein the first hydrotreated product stream removed from the first hydrotreatment reaction zone is cooled before being hydrotreated within the second hydrotreatment reaction zone.

33. A process according to claim 14, wherein the first hydrotreated product stream is passed through a separator to remove light ends, CO, $CO_2$, and water before being hydrotreated within the second hydrotreatment reaction zone.

34. A process according to claim 14, wherein the hydrocarbon stream recovered after step d) is a diesel fuel.

* * * * *